Dec. 17, 1968  J. M. LEONARD ETAL  3,417,251
TOWED INSTRUMENT FOR CONTINUOUS MEASUREMENT OF OCEAN TURBIDITY
Filed Oct. 20, 1965
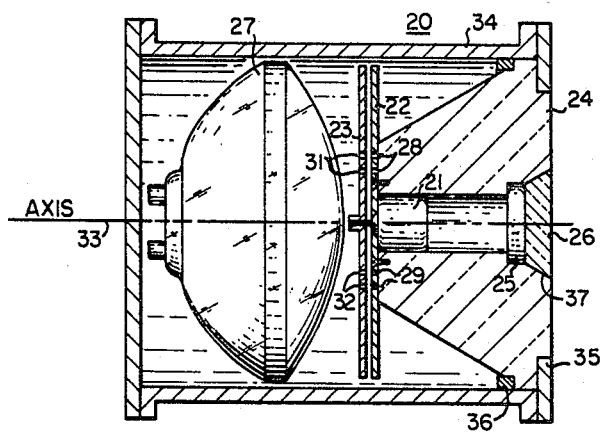
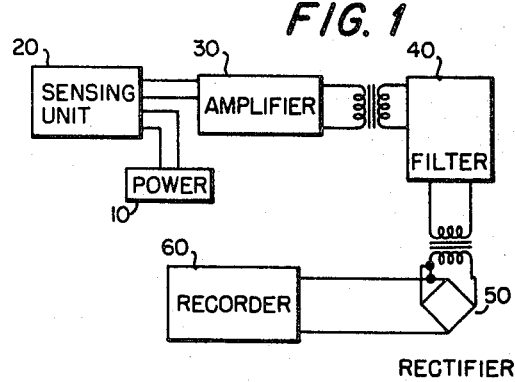
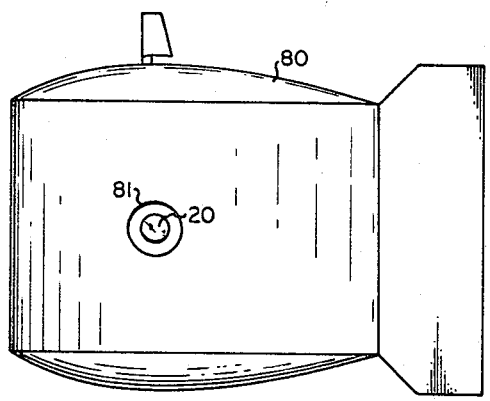
INVENTOR
JOHN M. LEONARD
JOHN D. BULTMAN
BY *R. S. Sciascia*
ATTORNEY

# United States Patent Office 3,417,251
Patented Dec. 17, 1968

3,417,251
TOWED INSTRUMENT FOR CONTINUOUS MEASUREMENT OF OCEAN TURBIDITY
John M. Leonard, Chevy Chase, and John D. Bultman, Oxon Hill, Md., assignors to the United States of America as represented by the Secretary of the Navy
Filed Oct. 20, 1965, Ser. No. 499,110
6 Claims. (Cl. 250—218)

ABSTRACT OF THE DISCLOSURE

An improved instrument for measuring the turbidity of fluid media. The device may include a towable vessel of streamlined configuration to prevent light reflecting cavitation and within which are located a light source, a light beam chopper, means to direct and focus the light in a zone exterior of the vessel, and a light detecting element positioned within the vessel to measure back-scattered light as a function of turbidity.

---

The invention described herein may be manufactured and used by or for the Government of the United States of America for governmental purposes without the payment of any royalties thereon or therefor.

The present invention relates to a turbidity-measuring system and more particularly to a towable sensing unit for producing, by the use of back-scattered light, a continuous horizontal profile of ocean turbidity at any depth, limited only by the ability of the materials to withstand the water pressure.

In the field of measurements of turbidity in the sea, it has been the general practice to employ devices where the measuring signal is a function of attenuation of transmitted light and which have been used from a stationary platform, e.g. a ship lying dead in the water. Although such devices have served the purpose, they have not proved entirely satisfactory under all conditions of service for the reasons that such devices provide only a vertical turbidity profile with station-to-station discontinuities and such devices relying on the attenuation of light are not sensitive enough for many applications.

It has also been the general practice to employ devices for taking horizontal profiles of turbidity which devices have been firmly affixed to a ship's hull. Although these devices have served the purpose, they have not proved entirely satisfactory under all conditions of service because such devices take data at only one, relatively shallow depth.

The general purpose of this invention is to provide a turbidity-measuring system which embraces all of the advantages of similarly employed turbidity-measuring devices and possesses none of the aforedescribed disadvantages. To attain this the present invention contemplates a towable turbidity-measuring device which measures back-scattered light, whereby a continuous horizontal profile of turbidity can be attained at any depth, limited only by the ability of the materials to withstand the water pressure, and whereby the signal from the back-scattered light is a function of the amount of light reflected by particulate matter rather than the attenuation of transmitted light caused by the presence of these particles.

An object of the present invention is to provide a towable turbidity-measuring device for measuring water turbidity.

Another object is to provide a towable turbidity-measuring device for measuring water turbidity at any depth, limited only by the ability of the materials to withstand the water pressure.

A further object of the invention is the provision of a towable turbidity-measuring device for attaining a continuous horizontal profile of turbidity at any depth down to several hundred feet by the use of back-scattered light.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 shows a block diagram of the turbidity-measuring system;

FIG. 2 illustrates a view in section of a preferred embodiment of the sensing unit of the invention;

FIG. 3 is a side elevation of the sensing unit as it is contained within a cavitation-free, towable, marine vessel.

Referring now to the drawings, there is shown in FIG. 1 a power source 10 supplying sensing unit 20 which, in turn, transmits a pulsating light at the rate of 80 pulses/sec., or at any other convenient frequency, so that the light is back-scattered from particles in the water and onto a light-sensitive portion of the sensing unit. The operation of the sensing unit 20 will be better understood by reference to FIG. 2 and its related description.

The output of the sensing unit 20 is proportional to the amount of pulsating (80 pulses/sec.) back-scattered light received and is electrically connected to the input of audio amplifier 30. The output of amplifier 30 is then electrically connected to bandpass filter 40, which is set to pass 80 cycles/sec., thereby eliminating all other undesirable frequencies, as well as the D.C. component generated by any daylight which penetrates the water and strikes the light-sensitive portion of the sensing unit.

The output of the bandpass filter 40 is then fed into a rectifier circuit 50 employing a copper oxide, full wave meter rectifier or a device having similar characteristics, and the output of the rectifier 50 drives a recorder 60 which displays the measure of water turbidity.

The preferred embodiment of light sensing unit 20 is shown in FIG. 2 in which an electric motor 21 having a stator 22 and a rotor 23 is mounted in the apex-portion of truncated cone 24 which may be formed of polymethylmethacrylate (Lucite) or a material having similar characteristics. A photosensitive element 25 is embedded within the base portion of cone 24 and is contained therein by Lucite plug 26, which is covered on surface 37 by an opaque coating 37. Rearward from rotor 23 and stator 22 is mounted a sealed-beam, automotive spot light 27 (mounting means not shown) which transmits light through apertures 28, 29, 31 and 32, located within the stator 22 and the rotor 23, respectively, and through the Lucite cone 24, which is machined so that the pulsating light passing through from apex to base is concentrated axially in a zone in the water about three inches in front of the base. These components of the light sensing unit 20 are arranged along a common axis 33 and are enclosed by canister 34, which may be of steel or like material, whereby Lucite cone 24 is mounted within the canister 34 by foot portions 35 and 36, and whereby the base portion of cone 24 and plug 26 are exposed and so form one wall portion of the sensing unit.

Referring now to FIG. 3 of the drawing, the sensing unit 20 is shown mounted within cavitation-free, towable, marine vessel 80 in such a manner that the sensing unit 20 is side-looking through a circular window 81 cut in the vessel's port wall.

In the operation of the new turbidity-measuring apparatus the sensing unit 20 is mounted within towable vessel 80 for transporting the sensing unit 20 through the water, and an electronic processing system which comprises the amplifier 30, the filter 40, the rectifier 50 and the recorder 60, is located aboard the towing ship (not shown), and translates the signal from the sensing unit 20 into a trace for permanent record.

The light beam from the spot light 27 is interrupted by a mechanical biquadrant chopper formed by the periodic alignment of the apertures 31 and 32 of the rotor 23 with the apertures 28 and 29 of the stator 22, which periodic alignment interrupts the light at the rate of 80 pulses/sec.

The Lucite cone 24 is machined so that the light passing through from apex to base is concentrated axially at a zone in the water about three inches in front of plug 26 and the base of cones 24, in which is centered a Weston Selenium Photovoltaic cell (Model 856, Type RR) or a photo cell having similar characteristics which is activated by the reflected light. The opaque coating 37 on plug 26 prevents any light from the lamp 27 from directly striking the photo cell 25. Sea water is nearly opaque to red wavelengths, so the first model of the device used a red filter over the photo-sensitive element instead of a chopper to eliminate the effect of daylight. However, some daylight signal still remained.

To completely eliminate the undesirable background caused by daylight, the chopper mechanism consisting of rotor 23 and stator 22 was installed to provide a pulsating light field at a fixed frequency.

The pulsating light, as reflected off particles in the water 70, produces a corresponding electrical signal within the photo cell 25, which signal is fed into audio amplifier 30. The amplified signal is fed into bandpass filter 40 which is set to pass 80 cycles/sec., thereby eliminating all other undesirable frequencies, as well as the D.C. component generated by the daylight. The output of the bandpass filter 40 is fed into the rectifier circuit 50, which may be a Conant, Type B, copper oxide, full-wave meter rectifier, the output of which, in turn, drives a recorder 60, which may be a model G-11A Varian recorder. Because of this circuit arrangement a red filter is not necessary in front of the photocell in order to exclude the effect of daylight.

The light intensity of spot light 27 and the speed of chopper motor 21 are controlled manually by varying the current flow through the circuit by means of a variable 26 ohm Cutler-Hammer motor controller (not shown), and a D.C. Ammeter (not shown). To assure full light intensity and motor speed, it is necessary to provide the sensing unit 20 with 12 volts D.C. at 2.6 amps. Because of cable and other resistances in the circuit, this voltage level at the sensing unit requires a 70 volt D.C. supply.

The sensing unit 20 is housed in a towable vessel 80, which is so streamlined as to be free of reflection-producing cavitation, and the sensing unit 20 is mounted so that it is side-looking through a circular window 81 in the vessel's port or starboard wall.

The towable vesel 80 is towed by a cable such as a 0.300 inch stainless steel, armored, multiconductor electrical cable (3-H-1, modified) (not shown) which is supplied by the American Steel and Wire Co., or by a cable having similar characteristics.

During operation of the apparatus it is very important to be able to adjust the towing depth of the vessel 80 to the desired operating depth. On the basis of known weight and drag characteristics of the vessel 80 and of the cable, the towing depth can be calculated as a function of the ship's speed and the length of cable paid out. For convenience of operation, families of curves relating these variables can be prepared.

It is, therefore, apparent that the invention very effectively provides for the measurement of water turbidity over a continuous horizontal profile at any depth by the use of back-scattered light, the use of which results in more sensitive measurement of turbidity than is possible by the use of attenuated light.

Obviously, many modifications and variations of the present invention are possible in the light of the above teachings. It is, therefore, to be understood that within the scope of the appended claims the invention may be practiced otherwise than as specifically described.

What is claimed and desired to be secured by Letters Patent of the United States is:

1. A marine or fresh-water, turbidity-measuring system capable of producing a continuous horizontal profile of turbidity, comprising:
   a towable vessel,
   means for towing said vessel beneath the water surface,
   a light source positioned within said vessel,
   means for focusing the light in a zone exterior of said vessel and in close proximity thereto,
   said focusing means having a substantially circular cross-section, and
   light detecting means located coaxially within said focusing means for measuring back-scattered light as a measure of water turbidity.

2. A marine or fresh-water, turbidity-measuring system capable of producing a continuous horizontal profile of turbidity, comprising:
   a towable vessel,
   means for towing said vessel beneath the water surface,
   a light source positioned within said vessel,
   a chopper which periodically interrupts the light emanating from said light source,
   means focusing the light in a zone exterior of said vessel and in close proximity thereto,
   a light detecting element located within said vessel for measuring back-scattered light as a measure of turbidity, and
   means recording the electrical output of said light detecting elements.

3. A turbidity measuring system as defined in claim 1 including a chopper which periodically interrupts the light emanating from said light source.

4. A turbidity measuring system as defined in claim 1 including a cavitation-free vessel enclosing said sensing unit.

5. A turbidity-measuring system as defined in claim 2 wherein the towable vessel is so streamlined as to be free of reflection-producing cavitation.

6. A turbidity-measuring system as defined in claim 2 wherein the means recording the output of said light detecting element comprises:
   means amplifying the output of said light detecting element,
   means filtering the output of said amplifying means in order to pass a predetermined range of frequencies,
   means rectifying the output of said filtering means, and
   means recording the output of said rectifier.

References Cited

UNITED STATES PATENTS

| | | | |
|---|---|---|---|
| 2,401,929 | 6/1946 | Hammond | 250—218 X |
| 2,654,242 | 10/1953 | Fallgatter et al. | 88—14 X |
| 2,856,811 | 10/1958 | Kaye | 250—218 X |
| 2,906,916 | 9/1959 | Palmer | 250—203 X |
| 2,964,640 | 12/1960 | Wippler | 250—218 |
| 3,263,553 | 8/1966 | Baruch | 250—218 X |
| 3,278,753 | 10/1966 | Pitts et al. | 250—218 |

WALTER STOLWEIN, Primary Examiner.

U.S. Cl. X.R.

88—14